Sept. 2, 1958 W. S. MILLER ET AL 2,850,268
REFRIGERATOR-TYPE ICE CREAM FREEZER
Filed Feb. 16, 1953 4 Sheets-Sheet 1
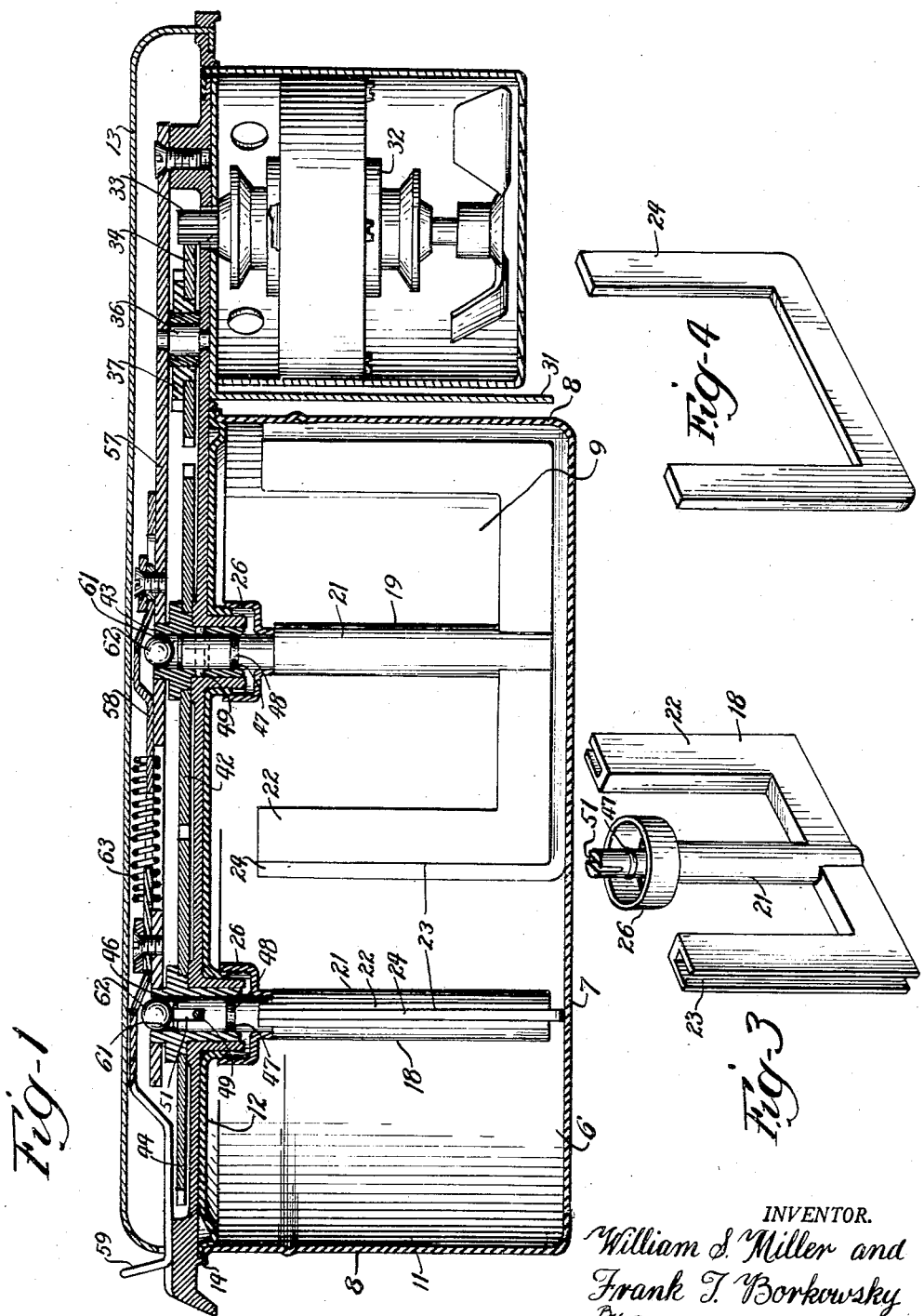
INVENTOR.
William S. Miller and
Frank T. Borkowsky
By
William D. McFarland Atty.

Sept. 2, 1958 W. S. MILLER ET AL 2,850,268
REFRIGERATOR-TYPE ICE CREAM FREEZER
Filed Feb. 16, 1953 4 Sheets-Sheet 2
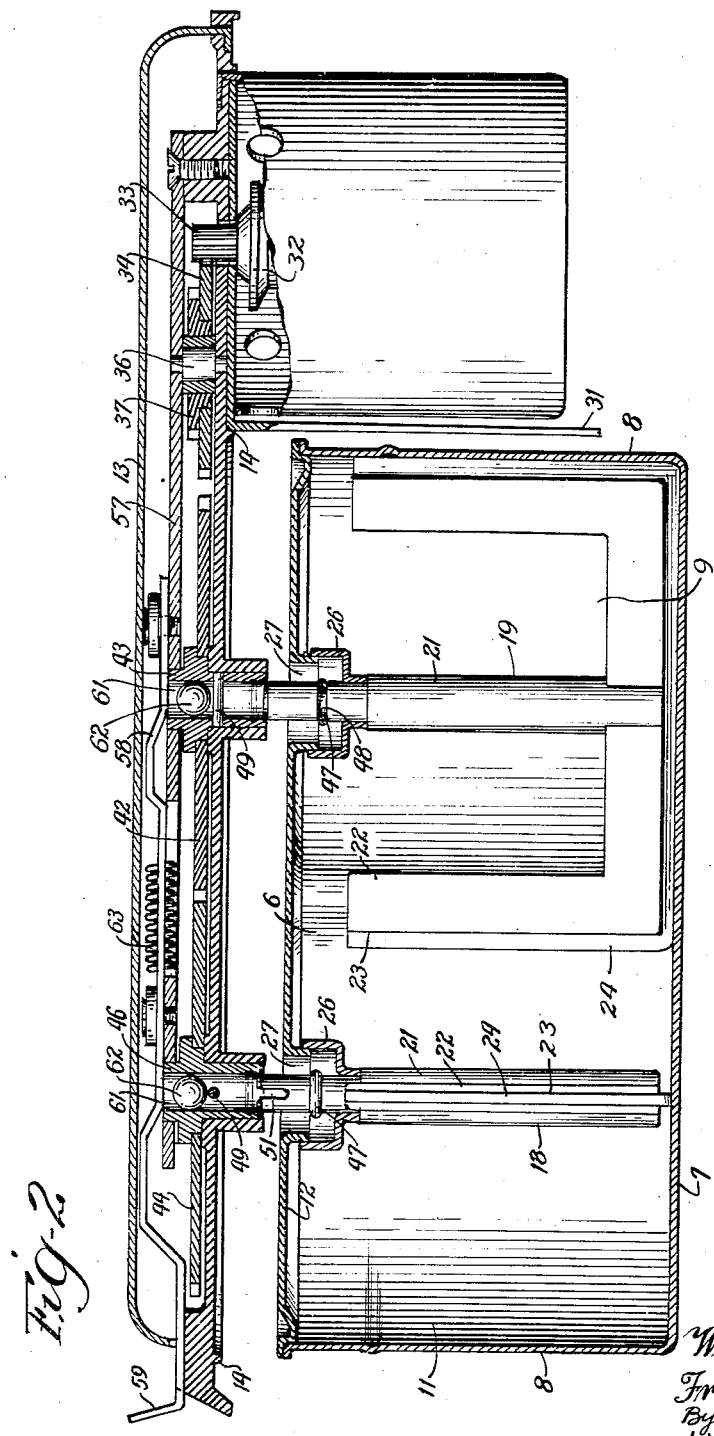
INVENTOR.
William S. Miller and
Frank T. Borkowsky
By
William D. McFarland
Atty.

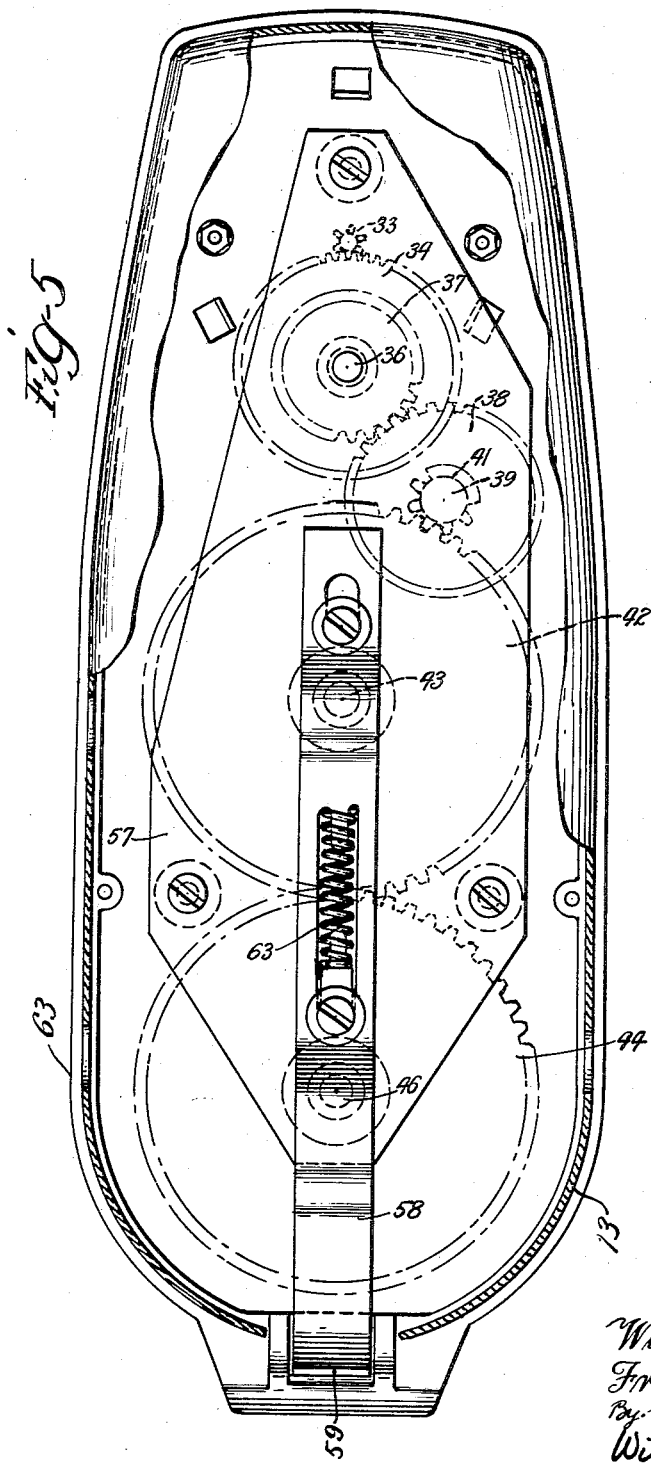

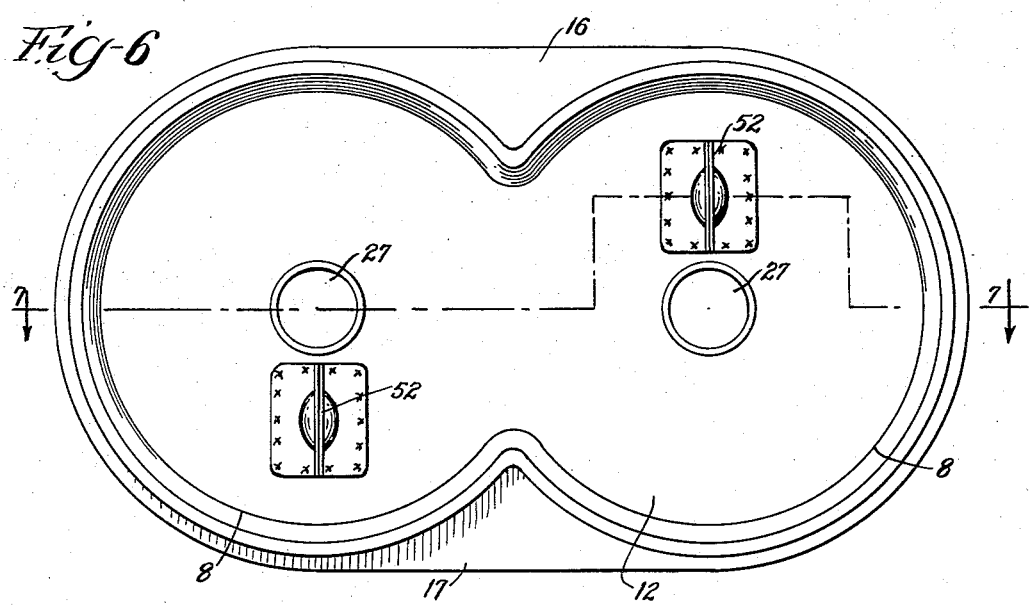
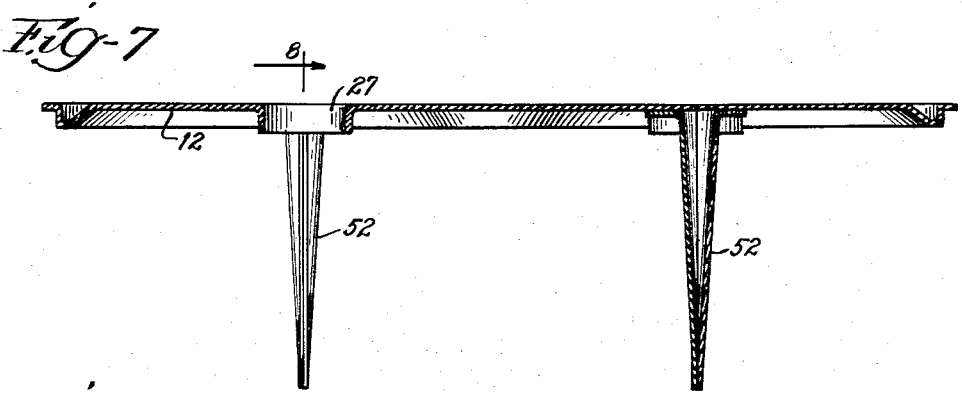
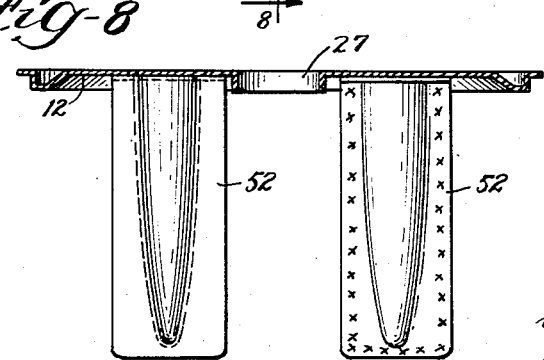

United States Patent Office 2,850,268
Patented Sept. 2, 1958

2,850,268

REFRIGERATOR-TYPE ICE CREAM FREEZER

William S. Miller and Frank T. Borkowsky, Ottawa, Ill., assignors, by mesne assignments, to said Miller Application February 16, 1953, Serial No. 336,952

2 Claims. (Cl. 259—119)

The idea of using the evaporating or freezing compartment of a refrigerator as the cooling medium in a home-type ice cream freezer has been suggested by many persons, none of whom, however, has developed an entirely satisfactory freezer. The known refrigerator-type ice cream freezers either merely stir the unfrozen liquid ice cream mixture, which tends to produce an irregular product, or at best erroneously adopt the dashers of the brine-type freezer which scrape the side walls only. We have determined that in a refrigerator-type ice cream freezer the principal heat transfer occurs on the bottom of the mixing tray which rests in face-to-face contact with the bottom of the freezing compartment. One feature of the present invention is the provision of a mixing tray entire bottom, as well as the side walls, of which are scraped.

Another object of the present invention is to provide a freezer having a mixing tray so shaped as to provide the largest feasible ratio of the area of its external surfaces which will be cooled either by face-to-face contact with the freezing compartment or by exposure to the cold air therein, to the volume of unfrozen liquid ice cream mixture therein.

Another object of the present invention is to provide means for scraping from all interior surfaces of the mixing tray which are opposed to said cooled external area the minute particles of ice cream as they are formed and for replacing said crystals with unfrozen liquid ice cream mixture.

Additional objects and advantages of the invention will be apparent from the following description and from the drawings.

The drawings:

Figures 1 and 2 are diagrammatic representations of an apparatus embodying the invention, showing successive positions of the parts as the mixing tray is detached, some parts being omitted for clarity.

Figure 3 is a perspective view of a dasher or scraper used in the apparatus.

Figure 4 is a perspective view of a scraper blade.

Figure 5 is a view from above of the apparatus, shown partly in horizontal section, some details being omitted for clarity.

Figure 6 is a view of the underside of the cover 12 of the mixing tray, showing baffle plates not shown in Figures 1 and 2.

Figures 7 and 8 are sectional views taken along the lines 7—7 and 8—8 of Figures 6 and 7 respectively.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

GENERAL DESCRIPTION

The apparatus comprises a mixing tray 6, into which is poured a substantially liquid edible mixture, such as unfrozen ice cream, at least one rotatable scraper or dasher 18 bearing scraper blades 24 so shaped as to remove from the cold walls of tray 6 the frozen particles of the mixture as they form, a motor 32 and means for transmitting the power supplied by the motor 32 to the dasher 18 to rotate it.

The mixing tray

In the illustrated form of the invention there is provided an elongated container or mixing tray 6 having a flat bottom 7 and substantially vertical side walls 8 which form two hollow cylinders 9 and 11 overlapping or merging along a common cord, as best illustrated in Figure 6 by the corresponding shapes of the inner portions of cover 12.

At their upper edges, walls 8 are flanged outwardly to provide a rest for removable cover or lid 12, which in turn is fitted to nest snugly up into rim 14 on the underside of the horizontally extending portion of combined motor housing and gear casing 13. Horizontal extensions 16 and 17 of cover 12, and corresponding extensions of walls 8, if desired, are adapted to provide a space where a securing device may readily be applied to secure together tray 6 and casing 13 during freezing operations.

The scrapers

Centered in cylinders 9 and 11 respectively are scrapers 18 and 19 comprising shafts 21, having rigidly attached to their lower ends U-shaped blade supports 22. Fitting in grooves 23 of blade supports 22 are scraper blades 24, adapted to rub against or scrape the bottoms 7 and side walls 8 of cylinders 9 and 11, to remove therefrom the minute particles of ice cream as they are formed. In the illustrated form of the invention the preferred U-shaped scraper blades balance shafts 21 and, because they simultaneously scrape opposite wall portions, permit relatively a slow rate of rotaton. An L-shaped scraper blade could be utilized. It will be appreciated that many equivalent structures are possible, such as screwing to each arm and to the bottom of blade support 22 a separate, straight scraper blade. Guards 26 may be secured near the upper end of shafts 21 overlapping flanges around opening 27 to prevent any of the liquid ice cream mixture from splashing thru openings 27 in cover 12.

Scraper drive

Mounted in the portion of casing 13 which extends downwardly near one end of tray 6, but separated therefrom by a portion of the casing wall and by shield 31 which aids in deflecting the motor heat from the tray is electric motor 32 the current for which may be supplied from any convenient outlet. Because of the resilient moulding customarily used with refrigerator doors, the motor cord may be extended to an outlet within the refrigerator. In the illustrated form of the invention, the motor shaft is provided with a small pinion 33 which meshes with gear wheel 34 mounted on and turning with shaft 36. Gear 37, mounted on shaft 36, meshes with gear 38, mounted on and turning with shaft 39. Gear 41, mounted on shaft 39, meshes with gear 42, mounted on and turning hollow shaft 43. Gear 42 meshes with gear 44, mounted on and turning hollow shaft 46.

The bifurcated tops of shafts 21 slide into the lower ends of hollow shafts 43 and 46, being held therein by spring clips 47 in grooves 48 in shafts 21, springing into corresponding grooves in hollow shafts 43 and 46. Pins 49, extending through hollow shafts 43 and 46, are thus placed in slots 51, positioning the scrapers at right angles to one another, pressing the bottoms of scraper blades 24 firmly against bottom 7 of tray 6, and making a driving connection between hollow shafts 43 and 46 and the scrapers.

Equivalent drive mechanisms, such as using sprocket wheels and drive chains, or using a drive shaft bearing worm gears connecting the motor shaft and the hollow shafts 43 and 46, may be used in the freezer. Preferably, however, the two scrapers will rotate in opposite directions. This will tend to prevent a more or less uniform, continuous flow of the unfrozen liquid ice cream mixture in the tray, as was the case in the aforementioned prior art which merely stirred the mixture as opposed to scraping portions of it from the tray. Rather, it will cause a turbulent action as a result of which the minute particles of ice cream which are scraped from walls 8 and bottom 7 will tend to remain in the center of cylinders 9 and 11. This result is enhanced by the provision of at least one baffle 52 in both cylinders 9 and 11, preferably positioned as shown in Figures 6–8. To prevent ice cream mixture from accumulating and contaminating the freezer, there should be no rough surfaces on the baffle and no crevices where it is attached, as by welding, to cover 12.

Scraper kick-out

For convenience in removing tray 6 after the ice cream has been made, it is desirable to be able to leave scrapers 18 and 19 imbedded in the ice cream while separating tray 6 from casing 13. One apparatus for kicking out the scrapers is illustrated in Figures 1, 2 and 5.

A plate 57, resting on shoulders of hollow shafts 43 and 46, and secured at one or more points to casing 13, extends longitudinally of casing 13 inside thereof. Slidably secured to plate 57, cam bar 58 extends at least from handle 59, protruding from casing 13 at the end opposite from that containing the motor, to a point beyond hollow shaft 43, being arched slightly at the parts thereof positioned over hollow shafts 43 and 46 to form retainers over the upper chambers 61 within hollow shafts 43 and 46 bottomed by pins 49. Movement of bar 58 from its normal position, illustrated in Figure 1, to the kick-out position, illustrated in Figure 2, brings the sloping sides of the arched portions thereof into contact with balls 62, which are confined within chambers 61 by bar 58 and pins 49, gradually forcing downwardly balls 62 and, as a consequence thereof, shafts 21. A return spring 63 for bar 58 may be provided.

Miscellaneous

For convenience in operation, it may be desirable to attach to motor 32 a shut-off, commercially obtainable, which will operate to turn off the motor when the ice cream mixture has reached the desired consistency.

For some edible mixtures which freeze into an unusually stiff bond with tray 6, it may be desirable to provide sharp edged scraper blades 24 and to attach them at an angle to blade supports 22, so that in operation the blade face will be at an acute angle to walls 8. The scraper blades 24 are preferably made of wood or plastic while the tray 6 is preferably of a harder material, such as stainless steel, so that the scraping action will not abrade or shave particles off the tray.

The illustrated apparatus is provided with a tray 6 having two hollow cylinders, with substantially vertical side walls 8. It is necessary to have the side walls 8 the same distance from shaft 21 at any given height, so that they will be contacted by scraper blades 24. However, the side walls need not be vertical.

The apparatus could have one hollow cylinder, or a larger number, depending on the size and shape of freezer desired, which in turn depends on the size and shape of the freezing compartment of the refrigerator, although, as indicated above, it is desirable to obtain the largest feasible ratio of the area of the trays cooled external surface to the volume of unfrozen liquid ice cream mixture therein. The illustrated apparatus was designated to occupy the length of space of the common ice trays, so that a pair of hollow cylinders was indicated.

Joining of two or more hollow cylinders, as is done in the illustrated apparatus, necessitates the eliminaton of their walls where they merge along a common cord. For convenience, in certain of the appended claims these hollow cylinders are described as being round in cross-section whether a particular hollow cylinder has a completely circular vertical wall itself or whether a portion of its walls has been thus eliminated.

Tray 6 may be provided with a thickened end or side wall, so that, while maintaining the same interior shape, the exterior shape will be flat and may be placed in face-to-face contact with a wall of the refrigerator freezing compartment. At present, however, this is not the preferred form, it appearing that the possible advanages of his contact will not offset the disadvantages of impaired heat transfer characteristics and materially increased weight.

We claim:

1. In a freezing device comprising a freezing tray, a removable drive casing adapted to be secured over said tray, and depending from said casing a rotatable scraper having a central shaft bifurcated at its upper end, the combination of a hollow drive shaft rotatably mounted within said casing and having one open end extending through the bottom of said casing, a pin extending across said hollow shaft between its ends, a bar slidably mounted within said casing over said hollow shaft, having one end extending beyond said casing to serve as a handle, said bar being substantially on the plane of the axis of said hollow shaft excepting an arched portion adapted to rest over said hollow shaft, a ball confined within said hollow shaft by said bar and said pin, and means for removably holding the upper end of said scraper shaft within the lower end of said hollow shaft with the two arms of said upper end positioned on either side of said pin.

2. In a freezing device comprising a freezing tray, a removable drive casing adapted to be secured over said tray, and depending from said casing a rotatable scraper having a central shaft bifurcated at its upper end, the combination of a hollow drive shaft rotatably mounted within said casing and having one open end extending through the bottom of said casing, a pin extending across said hollow shaft between its ends, a bar slidably mounted within said casing over said hollow shaft, having one end extending beyond said casing to serve as a handle, said bar being substantially on the plane of the axis of said hollow shaft, excepting an arched portion adapted to rest over said hollow shaft; a ball confined within said hollow shaft by said bar and said pin, the upper end of said scraper shaft being adapted to slide within the lower end of said hollow shaft with the two arms of said upper end positioned on either side of said pin.

References Cited in the file of this patent

UNITED STATES PATENTS

| | | |
|---|---|---|
| 526,596 | Weston | Sept. 25, 1894 |
| 961,272 | Ward | June 14, 1910 |
| 1,224,798 | Saxe | May 1, 1917 |
| 1,292,141 | Swigert | Jan. 21, 1919 |
| 1,790,365 | Brennan | Jan. 27, 1931 |
| 1,841,434 | Gibson | Jan. 19, 1932 |
| 1,873,407 | Holland | Aug. 23, 1932 |
| 1,922,784 | Sheriff et al. | Aug. 15, 1933 |
| 1,997,035 | Arbuckle | Apr. 9, 1935 |
| 2,013,887 | Jeppsson | Sept. 10, 1935 |
| 2,082,752 | Lewis et al. | June 1, 1937 |
| 2,305,288 | Cavalleri | Dec. 15, 1942 |
| 2,566,907 | Robertson | Sept. 4, 1951 |